United States Patent
Narayan et al.

(10) Patent No.: US 12,056,803 B2
(45) Date of Patent: Aug. 6, 2024

(54) SYSTEMS AND METHODS FOR IMPLEMENTING A VIRTUAL AVATAR MODEL FOR A VIDEO CONFERENCE SESSION

(71) Applicant: Verizon Patent and Licensing Inc., Basking Ridge, NJ (US)

(72) Inventors: Harish Narayan, Karnataka (IN); Sourabh Khire, San Jose, CA (US); Gaurav Rihan, Bangalore (IN); Sayali G. Salvi, Neral (IN); Omkar Ghodke, Pune (IN); Ashish Nagpal, Karnataka (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 87 days.

(21) Appl. No.: 17/849,955

(22) Filed: Jun. 27, 2022

(65) Prior Publication Data

US 2023/0419580 A1 Dec. 28, 2023

(51) Int. Cl.
*G06T 13/40* (2011.01)
*H04L 12/18* (2006.01)
*H04N 7/15* (2006.01)

(52) U.S. Cl.
CPC ......... *G06T 13/40* (2013.01); *H04L 12/1822* (2013.01); *H04N 7/15* (2013.01)

(58) Field of Classification Search
CPC .................................................... G06T 13/40
See application file for complete search history.

(56) References Cited

U.S. PATENT DOCUMENTS

| | | | | |
|---|---|---|---|---|
| 2015/0213604 A1* | 7/2015 | Li | .......... | G06T 13/80 |
| | | | | 345/473 |
| 2021/0150792 A1* | 5/2021 | Ulyanov | ......... | G06T 7/194 |
| 2021/0360199 A1* | 11/2021 | Oz | .......... | G06T 15/04 |
| 2022/0166955 A1* | 5/2022 | Gronau | ......... | G06T 19/20 |

* cited by examiner

*Primary Examiner* — Shivang I Patel

(57) ABSTRACT

An exemplary method includes processing, by a virtual avatar processing system, a plurality of video conference recordings generated by a video conference platform to select user image information associated with a plurality of users that participated in video conference sessions represented in the plurality of video conference recordings. The exemplary method further includes generating, based on the user image information, a template model that is generic to a plurality of users, selecting, from the user image information and based on predefined selection criteria, video frames that depict a user included in the plurality of users, and generating a virtual avatar model of the user by applying the selected video frames to the template model. A visual representation of the virtual avatar model may be configured to be used in future video conference sessions in place of a live video image of the user.

20 Claims, 8 Drawing Sheets

SYSTEMS AND METHODS FOR IMPLEMENTING A VIRTUAL AVATAR MODEL FOR A VIDEO CONFERENCE SESSION

BACKGROUND INFORMATION

As computer technology has advanced, various tools have been developed to facilitate users virtually interacting with one another by way of computer systems. For example, video conferencing platforms have been developed to facilitate virtual collaboration between remote teams of users. However, recent increases in the volume of virtual meetings have been shown to induce meeting fatigue among attendees of the virtual meetings. Such meeting fatigue may be caused by long hours in front of a camera, prolonged eye contact, constantly seeing oneself in video chats, and/or a reduction in user mobility during virtual meetings. As a result of such meeting fatigue, users of video conference platforms may be less likely to engage and/or express ideas during virtual meetings, which results in lower productivity. In view of this, there remains room for improvement in implementing video conferencing technologies.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Systems and methods for implementing a virtual avatar model for a video conference session are described herein. In certain examples, for instance, an exemplary system may include a memory that stores instructions and a processor communicatively coupled to the memory and configured to execute the instructions to process a plurality of video conference recordings generated by a video conference platform to select suitable user image information associated with a plurality of users that participated in video conference sessions represented in the plurality of video conference recordings. The processor may be further configured to execute the instructions to generate, based on the user image information, a template model that is generic to the plurality of users, select, from the user image information and based on predefined selection criteria, video frames that depict a user included in the plurality of users, and generate a virtual avatar model of the user by applying the selected video frames to the template model. A visual representation of the virtual avatar model may be configured to be used in future video conference sessions in place of a live video image of the user.

Various advantages and benefits are associated with the systems and methods for implementing a virtual avatar described herein. For example, systems and methods such as those described herein may mitigate meeting fatigue during video conference sessions by using a virtual avatar model of a user in lieu of a live video image of the user. In addition, the systems and methods described herein leverage video conference recordings stored by a video conference platform to generate virtual avatar models as opposed to implementing cumbersome onboarding processes (such as requiring recordings of users in specified poses, lighting, distance from imager, etc.), which may discourage users from generating and/or using virtual avatar models. These and other benefits that may be provided by systems and methods described herein will be evident from the disclosure that follows.

Figure 1:
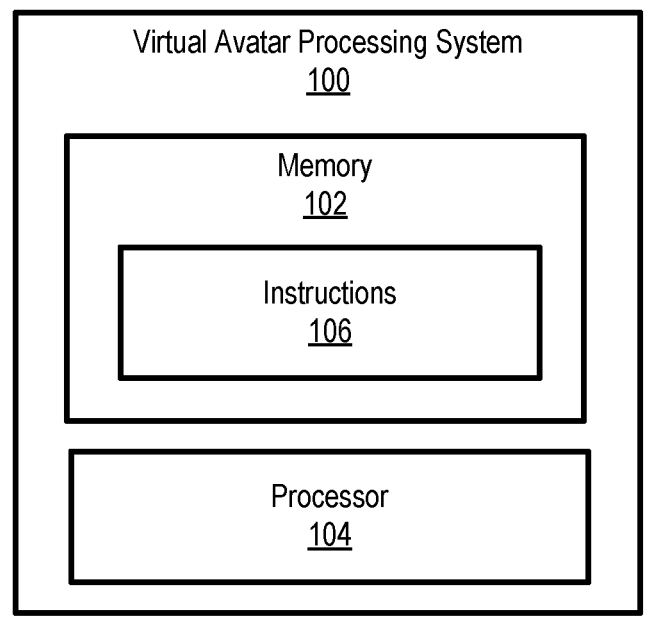
FIG. 1 illustrates an exemplary virtual avatar processing system according to principles described herein.

FIG. 1 illustrates an exemplary virtual avatar processing system 100 ("system 100") that may be implemented according to principles described herein. As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device. In other examples, memory 102 and/or processor 104 may be distributed between multiple devices and/or multiple locations as may serve a particular implementation. Illustrative implementations of system 100 are described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store data associated with video conference recordings, conference metadata (e.g., information indicating video mute states, information indicating a packet loss rate, video resolution information, bitrate information, geographic location data, etc.), template models (e.g., three-dimensional ("3D") template models), user image information, input data for a virtual avatar model, user profile information, graphical user interface content, and/or any other suitable data.

Processor 104 may be configured to perform (e.g., execute instructions 106 stored in memory 102 to perform) various processing operations associated with implementing a virtual avatar model for a video conference session. For example, processor 104 may perform one or more operations described herein to process a plurality of video conference recordings to facilitate generating a virtual avatar model for a user of a video conference platform. These and other operations that may be performed by processor 104 are described herein.

Figure 2:
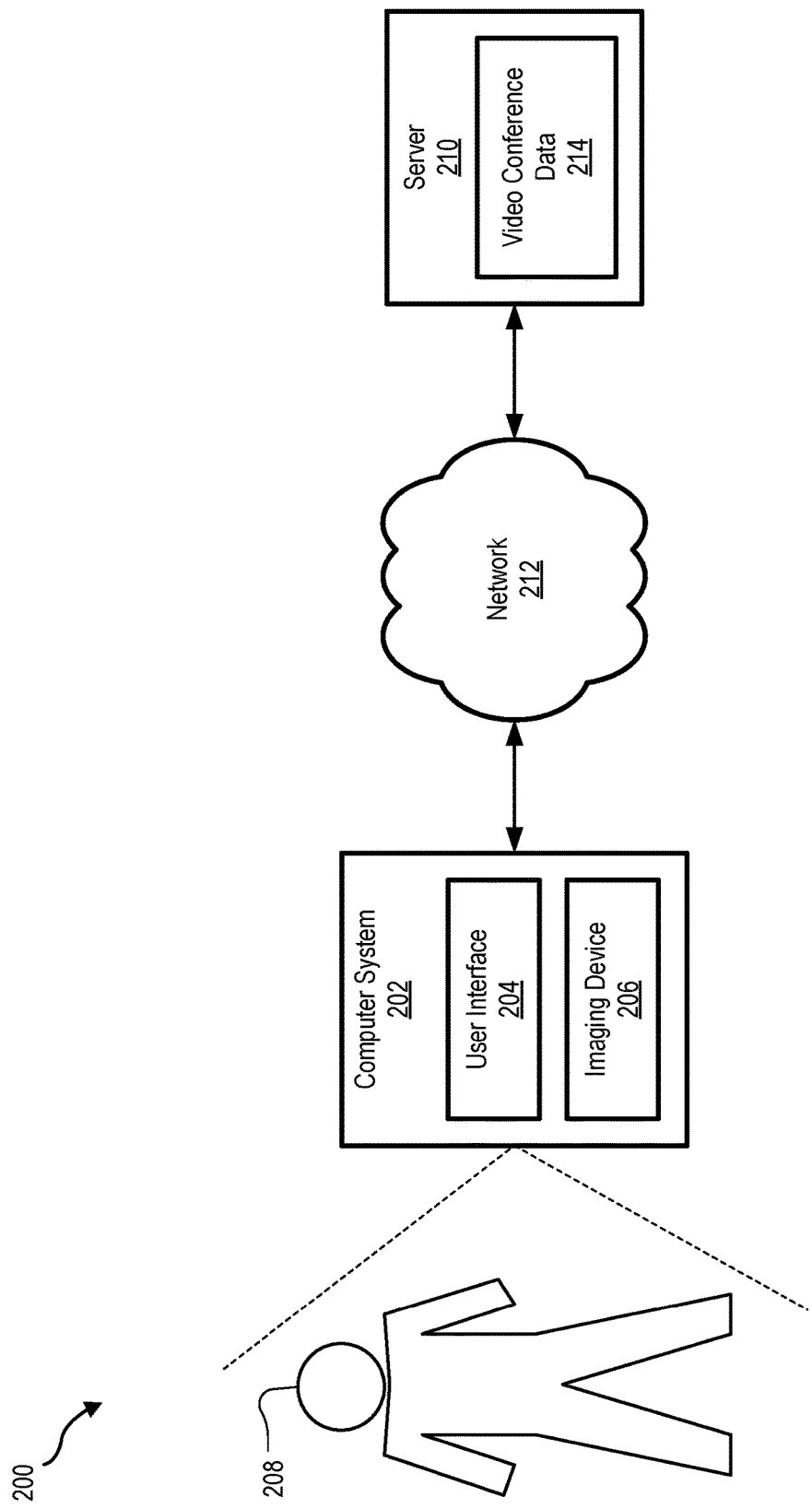
FIG. 2 illustrates an exemplary implementation of the virtual avatar processing system of FIG. 1 according to principles described herein.

System 100 may be implemented in any suitable manner. FIG. 2 shows an exemplary implementation 200 in which system 100 may be provided in certain examples. As shown in FIG. 2, implementation 200 includes a computer system 202 that includes a user interface 204 and an imaging device 206. Computer system 202 may include or be implemented by any suitable type of computing device or combination of computing devices as may serve a particular implementation. For example, computer system 202 may be implemented by a desktop computer, a laptop computer, a smartphone, a tablet computer, a head mounted display device, a virtual reality ("VR") device, an augmented reality ("AR") device, an internet-of-things ("IoT") device, and/or any other suitable device.

User interface 204 may correspond to any suitable type of user interface as may serve a particular implementation. For example, user interface 204 may correspond to a display device, a graphical user interface, a web interface (e.g., displayed by a display screen of a laptop computer), a holographic display interface, a VR interface, an AR interface, etc.

Imaging device 206 may correspond to any suitable type of imaging device that may be configured to capture imagery of a user 208 during a video conference session. For example, imaging device 206 may include a camera or other type of image capture device that may be configured to capture imagery of a user during a video conference session. As used herein, "imagery" may include any suitable type of image or images as may serve a particular implementation. For example, imagery may include a single image (e.g., a still image), a moving image (e.g., a plurality of sequential images such as a video), a depth image, and/or any other suitable type of image.

As shown in FIG. 2, computer system 202 is communicatively connected to a server 210 by way of a network 212. Server 210 may include any suitable computing device or system that may facilitate performing any of the operations described herein. In certain examples, server 210 may correspond to a cloud server. As shown in FIG. 2, server 210 includes video conference data 214 that may include any suitable information, such as described herein, that may be associated with video conference recordings. For example, video conference data 214 may represent recordings of past video conference sessions. In certain examples, all or a portion of video conference data 214 may be additionally or alternatively stored internally by computer system 202.

System 100 may be implemented by server 210 or computer system 202. Alternatively, system 100 may be distributed across server 210 and computer system 202, or distributed across server 210, computer system 202, and/or any other suitable computer system/device.

Network 212 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, and any other networks capable of carrying data and/or communications signals between server 210 and computer system 202. Communications between computer system 202, server 210, and any other system may be transported using any one of the above-listed networks, or any combination or sub-combination of the above-listed networks.

As will be described further herein, system 100 may be configured to perform one or more operations associated with implementing a virtual avatar model configured to be used during a video conference session. As used herein, a "virtual avatar model" may include any type of animatable visual representation of a user that may be provided for display during a video conference session in lieu of a live video image of the user. In certain examples, a visual representation of a virtual avatar model may be a photorealistic visual representation of the user. In such examples, the visual representation of the virtual avatar model may visually appear substantially similar to a realistic image of the user but is not a live video image captured by an imaging device (e.g., imaging device 206) during a video conference session.

As used herein, a "video conference session" may refer to any type of video communication session where two or more users communicate virtually by way of user interfaces of respective computer systems. Such user interfaces may include one or more graphical user interface views in which live video images of the users participating in the video conference session may be provided for display during the course of the video conference session. For example, a graphical user interface view may include a relatively large display window that depicts a live video image of a user participating in the video conference session and one or more relatively smaller display windows (e.g., along a bottom edge or a side edge of the graphical user interface view) that depict live video images of other users participating in the video conference session. An exemplary graphical user interface view that may be presented during a video conference session is described further herein.

Figure 3:
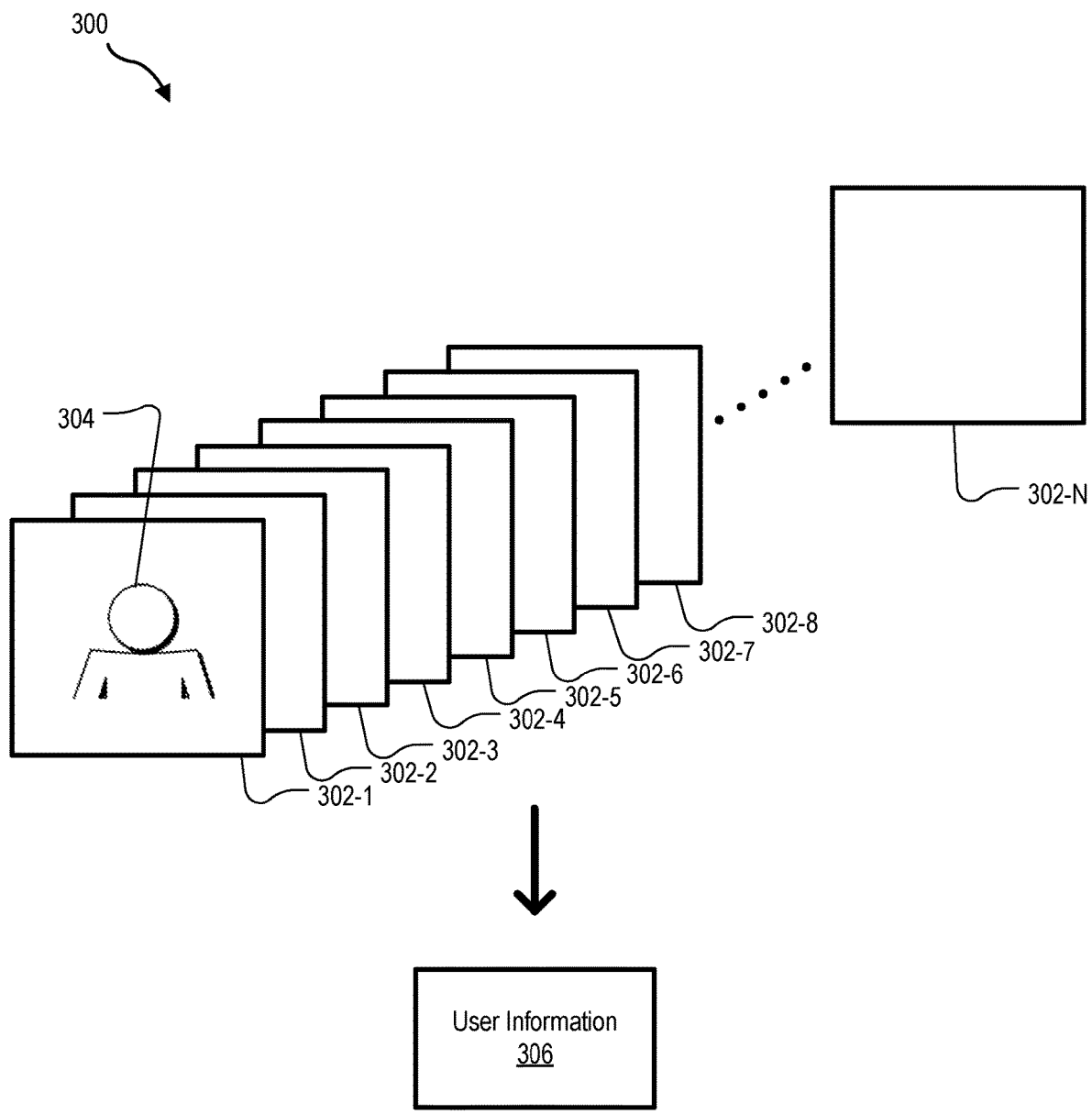
FIG. 3 illustrates an exemplary representation that schematically depicts processing of video conference recordings according to principles described herein.

As mentioned, presenting a live video image of a user during a video conference session may result in the user experiencing meeting fatigue. Accordingly, it may be desirable for one or more users participating in a video conference session to be represented by a visual representation of a virtual avatar model during a video conference session instead of a live video image. To that end, system 100 may be configured to process video conference recordings generated by a video conference platform to select user image information that may be used to train template models representing human physiology (e.g., a human head) and personalized models that can be used to generate virtual avatar models for individual users. FIG. 3 shows an exemplary representation 300 that schematically depicts processing of one or more video conference recordings 302 (e.g., video conference recording 302-1 through 302-N). Each video conference recording 302 may represent a different data instance associated with users that participated in previous video conference sessions. In certain examples, each of video conference recordings 302 may be specific to a particular user. Alternatively, at least some of video conference recordings 302 may be associated with different users (for example, as part of a template model training process).

In certain examples, each video conference recording 302 may represent a different past video conference session that a particular user participated in. For example, a user may participate in a weekly virtual work meeting conducted by way of a video conference platform and recorded by the video conference platform. In such an example, at least some of video conference recordings 302 may represent different video recordings of the weekly virtual work meeting where the user was a participant. For example, video conference recording 302-1 may represent a video recording of the weekly virtual meeting during a first week, video conference recording 302-2 may represent a video recording of the weekly virtual meeting during a second week, video conference recording 302-3 may represent a video recording of the weekly virtual meeting during a third week, and so forth. In some implementations, depending on whether part of a template model training process or a user-specific model training process, a single video recording may be used if its data meets the selection requirements for producing a virtual avatar model, such as described below.

As shown in FIG. 3, an image 304 of a user that participated in a video conference session is represented with respect to video conference recording 302-1. Image 304 may represent a video image of a particular user that participated in the video conference session represented by video conference recording 302-1. Although not shown in FIG. 3, it is understood that at least some of video conference recordings 302-2 through 302-N may also include an image of the particular user. In certain examples, the particular user may have his/her live video image feed muted at some point during a duration of a video conference session. As such, in certain examples, at least some of video conference recordings 302 may not include a video image of the particular user.

System 100 may process of the one or more video conference recordings, such as the video conference recordings 302 or a subset of the video conference recordings 302, to select user image information 306. User image information 306 may correspond to data that is determined to be suitable for use by system 100 to facilitate generating a virtual avatar model personalized for a user. For example, user image information 306 may include a selected set of video frames of the user from video conference recordings 302 that exclude frames that do not meet selection criteria and/or include frames that are needed to facilitate virtual avatar model generation.

System 100 may process video conference recordings 302 in any suitable manner as may serve a particular implementation. For example, in certain implementations, system 100 may process video conference recordings 302 by filtering video conference recordings 302 based on conference metadata. To illustrate an example, conference metadata may include information indicating whether (or when) a video conference recording 302 includes a muted state where a live video image of a user was not recorded during the video conference session or an unmuted state where a live video image of the user was recorded during a video conference session. Based on the information indicating video mute states, system 100 may filter (e.g., exclude) one or more of video conference recordings 302 from being used in the selected user image information 306 if system 100 determines that the live video image of the user was muted during recording of the video conference session (e.g., muted more than a threshold time or percentage of time of a video conference session).

To illustrate another example, conference metadata may include information indicative of video resolution associated with video conference recording 302. Any of video conference recordings 302 that have a video resolution below a predefined threshold may not be suitable for being used for virtual avatar model generation. Accordingly, if the video resolution of, for example, video conference recording 302-2 is below the predefined threshold, system 100 may filter (e.g., exclude) video conference recording 302-2 from being included in the selected user image information 306.

To illustrate another example, conference metadata may include information indicative of a bitrate associated with video conference recordings 302. A bitrate below a predefined threshold may indicate that a user had a poor network connection during the recording of the video conference session, which may result in a poor quality of video. Accordingly, if the bitrate associated with, for example, video conference recording 302-3 is below the predefined threshold, system 100 may filter (e.g., exclude) video conference recording 302-3 from being included in the selected user image information 306.

Additionally or alternatively, system 100 may process video conference recordings 302 by including, based on predefined selection criteria, a plurality of video frames that depict the user that participated in the video conference sessions represented in video conference recordings 302. The predefined selection criteria may include any suitable selection criteria as may serve a particular implementation. For example, the predefined selection criteria may use a number of metrics to assess image suitability for virtual avatar model generation, and apply thresholds for those metrics to select images to include in the user image information. In some implementations, those metrics may include: a presence factor that identifies, for example, the portion of a user's image represented within a video frame; a scale factor that identifies, for example, a size of a face of a user within a video frame (e.g., a raw size of the face of the user, a number of pixels associated with the face of the user, a percentage of the pixels of the video frame associated with the face of a user, etc.); an occlusion factor that identifies, for example, an amount of obscurement of a face of a user within a video frame; and/or any other suitable metric that may be useful in determining which video frames may be useful in generating a virtual avatar model for a user. In certain examples, system 100 may use the predefined selection criteria to determine which video frames to include and which video frames to exclude from the selected user image information being used to generate a virtual avatar. For example, video frames where a user is not depicted may be excluded, video frames with occluded or partially occluded faces and/or bodies of a user may be excluded, and/or video frames where the scale of, for example, a face of a user is too large or too small may either be excluded or subjected to a scale normalization process. System 100 may also apply video quality filtration to remove video images that do not meet video quality metrics and therefore would not be accurate depictions of user images.

In some implementations, system 100 may also include selection criteria that require the inclusion in the selected user image information 306 of images of users captured at various angles. For example, the selection criteria may require inclusion of video frames that provide a plurality of views of a user's face captured at different image capture angles relative to head position. Any suitable number of image capture angles may be represented in the plurality of video frames as may serve a particular implementation. For example, the plurality of video frames may include a first video frame that depicts a first view where the user's head is tilted up, a second video frame that depicts a second view where the user's head is tilted down, a third video frame that depicts a third view where the user's head is tilted up and to the left, a fourth video frame that depicts a fourth view where the user's head is tilted up and to the right, a fifth video frame that depicts a fifth view where the user's head is tilted to the left, a sixth video frame that depicts a sixth view where the user's head is tilted to the right, and/or any other suitable views or combination of views. The plurality of views of the user may include any suitable portion of the user as may serve a particular implementation. For example, the plurality of views of the user may include full body views, head and shoulders views, head views, or any other suitable views of the user captured at different image capture angles and included as part of user image information 306.

System 100 may implement one or more suitable data analytics processes (such as machine learning algorithms) to identify and select the plurality of views of the user to be included as part of user image information 306. For example, various image quality assessment models may be applied to determine whether a video image meets the video quality requirements for inclusion in the selected user image information, and a head pose detection network may be used to determine the capture angle for a user's head in an image and/or ensure the right capture angles have been received.

Based on user image information 306, system 100 may generate a template model that is used to produce the virtual avatar model of the user. System 100 may generate a template model in any suitable manner as may serve a particular implementation. In some implementations, system 100 may use at least some video frames included in user image information 306 to train one or more template models (e.g., 3D template models) which can serve as general (or generic) templates for the creation of user-specific virtual avatar models. System 100 may then use some video frames that are specific to a user to train a personalized virtual avatar model that is based on one of the template models. One of the benefits of this approach is that the processing needed to generate each personalized virtual avatar model may be reduced, since a template model can be generated ahead of time and applied across multiple users.

In certain examples, a template model such as described herein may correspond to a 3D template model. A 3D template model may be configured in any suitable manner as may serve a particular implementation. For example, the 3D template model may include a 3D face template model, a 3D head and shoulders template model, or a 3D full body template model. In some implementations, system 100 may use a 3D template model that is parameterized using shape coefficients and/or pose coefficients. The shape coefficients may correspond to the facial structure or body shape of a user. The pose coefficients may correspond to a global pose (e.g., translation and rotation) as well as a local pose (e.g., facial expressions or hand gestures) of the user. In certain examples, the shape coefficients and/or pose coefficients of a template model may be adjusted in any suitable manner to better fit a template model to a user. In certain examples, system 100 may determine optimal shape coefficients and/or pose coefficients to customize a 3D template model for a particular user and minimize reprojection errors. Such reprojection errors may be caused by an unacceptable distance between the two dimensional ("2D") keypoints in a video frame and the 3D keypoints of the 3D template model projected to the 2D keypoints.

System 100 may apply the selected video frames of a user in any suitable manner to a template model to facilitate generating a virtual avatar model of the user. For example, system 100 may derive 2D keypoints in a video frame using any suitable facial landmark/keypoint detection process (e.g., facial landmark/keypoint detection neural networks). Based on the 2D keypoints, a video frame may be applied to a 3D template model by projecting 3D keypoints defined by the 3D template model to corresponding 2D keypoints in the video frame. This process may be repeated for each of the video frames included in user image information 306 to generate the virtual avatar model.

Figure 4:
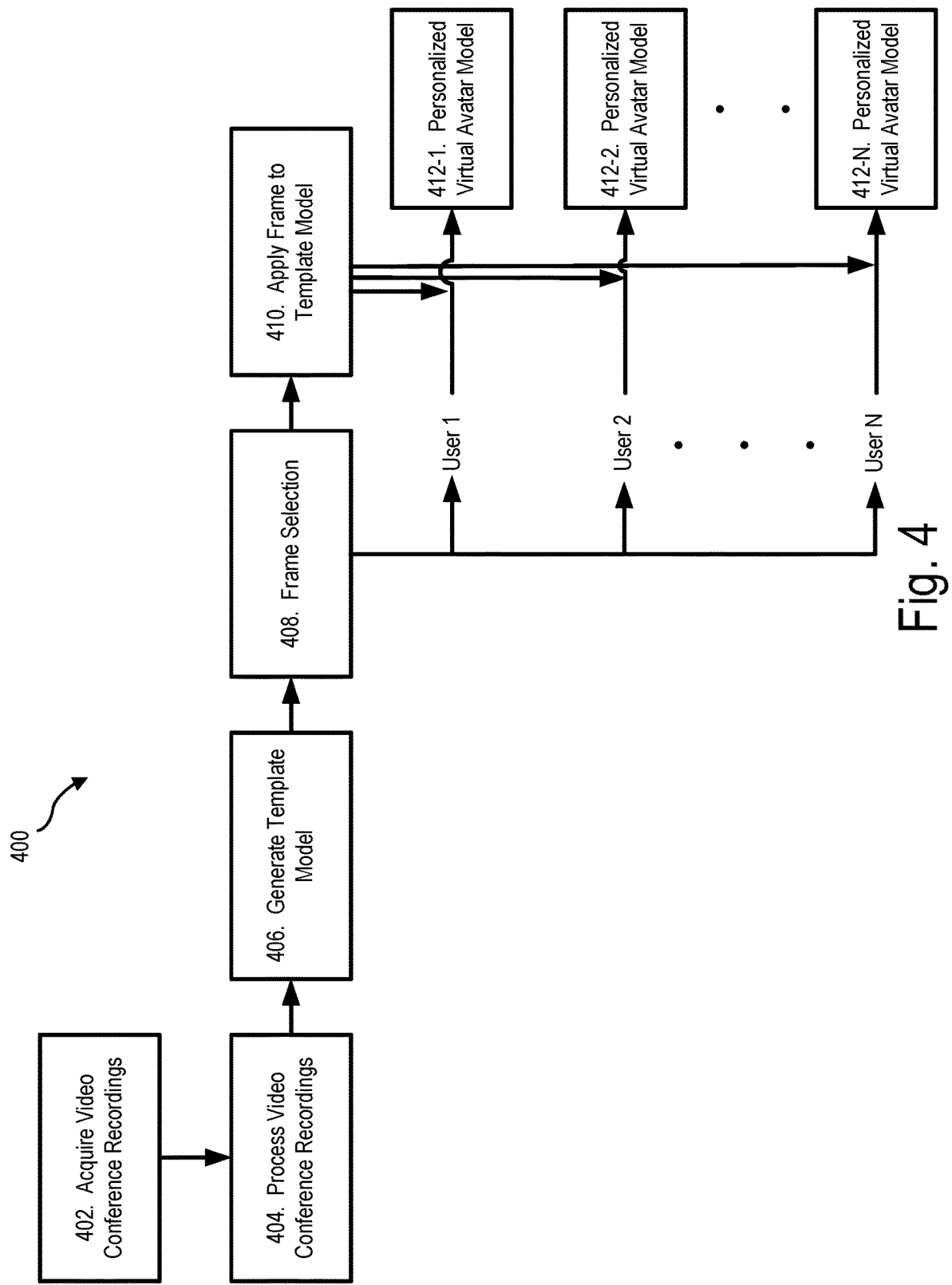
FIG. 4 illustrates an exemplary flow chart depicting various operations that may be performed according to principles described herein.

FIG. 4 depicts a flowchart 400 showing exemplary operations that may be performed by system 100 to facilitate generating a virtual avatar model configured to be used during a video conference session. At operation 402, system 100 may acquire video conference recordings from any suitable storage location (e.g., from video conference data 214 stored by server 210). At operation 404, system 100 may process the video conference recordings in any suitable manner such as described herein.

At operation 406, system 100 generates a template model that may be generic to a plurality of different users. The template model may be generated in any suitable manner based on user image information processed at operation 404. For example, system 100 may use the user image information processed at operation 404 to develop a training dataset to train a template model that is generic to a plurality of different users. Such a training dataset may be selected from video conference recordings 302 so as to represent and accommodate a wide variety of human faces and/or body shapes. System 100 may process video conference recordings 302 in any suitable manner to ensure a balanced distribution of video images in the training dataset. For example, user profiles on a video conference platform and/or geographic location information may be used to ensure that the training dataset is not skewed towards users from certain geographic locations and/or having certain ethnicities. In addition, system 100 may implement machine learning models in certain examples to identify skin-tone, hair variety, hair volume, and/or accessories (e.g., hats, glasses, jewelry, etc.) to ensure an even distribution of users with different races and/or appearances in the training dataset. The training dataset may also include a diversity of human faces captured from various angles. System 100 may use any suitable pose detection algorithm to estimate the pose of the human faces and ensure that the training dataset includes faces of users captured from a variety of camera angles. System 100 may then use the training dataset in any suitable manner to generate a parameterized and animatable template model that is generic to a plurality of different users.

At operation 408, system 100 may perform a frame selection process where user specific video frames may be selected from the processed video conference recordings. For example, a first set of frames may be selected for User 1 in FIG. 4. A second set of frames may be selected for User 2 in FIG. 4 and so forth.

At operation 410, system 100 may apply the frames selected at operation 408 to a template model. This may be accomplished in any suitable in any suitable manner such as described herein. For example, the first set of frames for User 1 may be applied to the template model to generate a personalized virtual avatar model 412-1 for User 1, the second set of frames for User 2 may be applied to the template model to generate a personalized virtual avatar model 412-2 for User 2, and so forth. System 100 may provide a visual representation of a virtual avatar model for display during a video conference session based on the personalized virtual avatar model. For example, system 100 may detect any suitable user input selecting an option to use the virtual avatar model of the user during a video conference session. Based on the user input, system 100 may provide the visual representation of the virtual avatar model for display to the user and/or other participants during the video conference session in place of a live video image of the user.

System 100 may provide a visual representation of a virtual avatar model for display during a video conference session in any suitable manner. In certain examples, the visual representation of the virtual avatar may be animated based on sensor data (e.g., cameras, microphones) capturing actions by the user during a video conference session. In such examples, system 100 may automatically animate the visual representation virtual avatar during the video conference session. As used herein, the expression "automatically" means that an operation (e.g., an operation of animating a visual representation of a virtual avatar) or series of operations are performed without requiring further input from a user. For example, system 100 may receive images of the user that are captured during a video conference session and input data corresponding to those images to the user's personalized avatar model, which may cause the virtual avatar model to change its depiction based on information detected from the captured images.

In some implementations, system 100 may perform analysis on the images captured during the video conference session in order to generate the input data used by the personalized virtual avatar model. In some implementations this analysis may include determining if the user is making certain facial expressions, gestures, and/or other movements. For example, system 100 may implement any suitable computer vision technology to determine facial expressions and/or gestures performed by the user during the video conference session. Based on the analyzing of the images captured during the video conference session, system 100 may generate coefficients, parameters, or other data to provide to the personalized virtual avatar model to reflect the facial expressions, movements, and/or gestures made by the user. In some implementations, certain facial expressions or other body movements may have pre-modeled implementations, such that if the movement is detected, the virtual avatar model can quickly adjust the visual representation of the virtual avatar model to reflect the movement. Additionally or alternatively, in some implementations, the raw or minimally processed image data is provided to the personalized virtual avatar model, and the virtual avatar model produces the appropriate visual representation adjustment using the image data.

Additionally or alternatively, system 100 may analyze audio detected (e.g., by way of a microphone associated with a computing device) during a video conference session to facilitate automatically animating a visual representation of a virtual avatar model as appropriate for someone speaking. For example, system 100 may use a microphone to determine that the user associated with a virtual avatar model is speaking. Based on such a determination, system 100 may automatically animate the visual representation of the virtual avatar model such that the mouth of the visual representation of the virtual avatar model appears to be speaking in a manner similar to the user. In certain examples, system 100 may use any suitable speech detection/linguistic algorithm to determine the words/sounds being produced by the user and predict which movements the mouth and/or lips of the user make while the user is speaking during the video conference session. In such examples, system 100 may use the speech models as input to the personalized virtual avatar model to generate a visual representation that reflects the predicted movements of the mouth and/or lips of the user.

In certain examples, system 100 may limit the animating of a visual representation of a virtual avatar model to only represent facial expressions of the user during the video conference session. In such examples, other movements made by a user during a video conference session may not be represented by the visual representation of the virtual avatar model. For example, during the video conference session, the user may stand up, move around, etc. but the visual representation of the virtual avatar model may appear to remain stationary. In so doing, it may be possible to reduce meeting fatigue by allowing the user to be more mobile during the video conference session without disrupting the video conference session experience for other participants.

Figure 5:
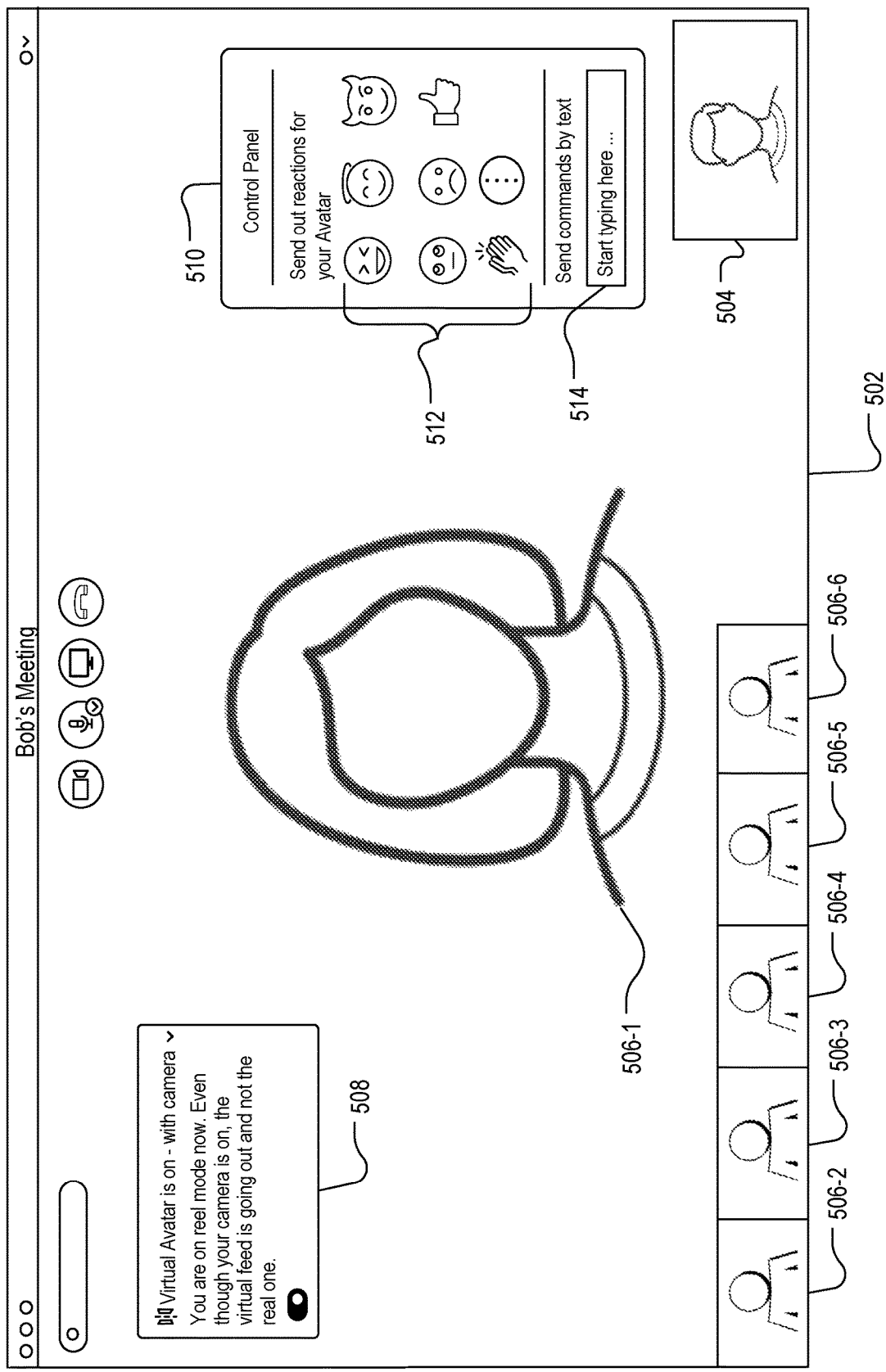
FIG. 5 illustrates an exemplary graphical user interface view that may be provided for display to a user during a video conference session according to principles described herein.

In certain examples, in addition to or as an alternative to automatically animating a visual representation of a virtual avatar model, system 100 may animate a visual representation of a virtual avatar model during a video conference session based on manual input provided by a user. For example, system 100 may animate a visual representation of a virtual avatar model based on a user selecting at least one of a predefined expression or a predefined gesture during a video conference session. Such predefined expressions or predefined gestures may be presented to a user for selection during a video conference session in any suitable manner. To illustrate, FIG. 5 shows an exemplary graphical user interface view 502 that may be provided for display by way of a computing device (e.g., a laptop computer) to a user during a video conference session. As shown in FIG. 5, graphical user interface view 502 includes a visual representation 504 of a virtual avatar model of the user that is participating in the video conference session and that is operating the computing device displaying graphical user interface view 502. User images 506 (e.g., user images 506-1 through 506-6) represent other participants in the video conference session. In certain examples, user images 506 may correspond to live video images of the other participants during the video conference session. In certain alternative examples, one or more of user images 506 may correspond to visual representations virtual avatar models if the associated users have selected to use visual representations of virtual avatar models instead of live video images during the video conference session. In the example shown in FIG. 5, user image 506-1 is relatively larger than visual representation 504 and the other user images 506 because the user represented by user image 506-1 may have control of the video conference session and/or may be currently speaking.

Visual representation 504 is provided for display within graphical user interface 502 in lieu of a live video image of the user. As such, graphical user interface view 502 also includes a notification 508 that informs the user represented by visual representation 504 that a virtual avatar mode is on and that, even though a camera of the computing device is on, visual representation 504 is provided for display to the user and other participants of the video conference session in place of a live video image of the user.

As shown in FIG. 5, graphical user interface view 502 further includes a control panel 510 through which the user represented by visual representation 504 may select predefined expressions or predefined gestures. In the example shown in FIG. 5, the predefined expressions and predefined gestures are represented by emoticons/icons 512 that depict different possible facial expressions or gestures that may be performed by visual representation 504. For example, in response to a user selection (e.g., by way of a mouse, cursor input, a touch input, etc.) of the frowning emoticon, system 100 may cause visual representation 504 to perform a frowning animation. In response to a user selection of the clapping gesture, system 100 may cause visual representation 504 to perform a clapping animation. The exemplary emoticons/icons 512 shown in FIG. 5 are provided for illustrative purposes only. It is understood that additional or alternative gestures/emoticons may be provided for display within control panel 510 in certain alternative implementations.

Additionally or alternatively, system 100 may animate visual representation 504 based on a text entry provided by the user by way of a text entry window 514 of control panel

510. For example, the user may enter "cheer" in text entry window 514. In response to the user entering "cheer" in text entry window 514, system 100 may cause visual representation 504 to perform an animation depicting a cheering gesture.

Figure 6:
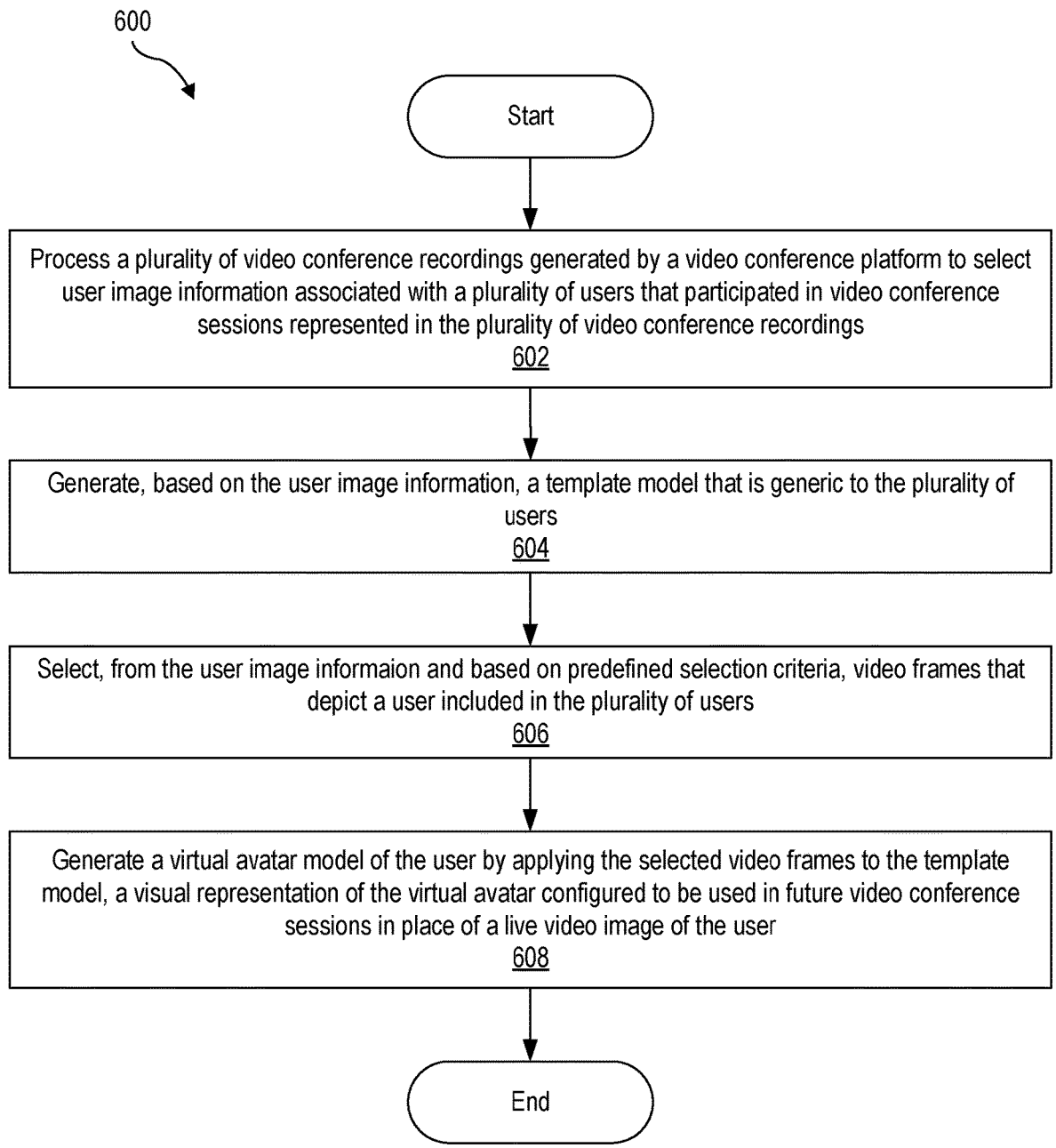
FIGS. 6-7 illustrate exemplary methods for implementing a virtual avatar model configured to be used during a video conference session according to principles described herein.

FIG. 6 illustrates an exemplary method 600 for implementing a virtual avatar model for a video conference session. While FIG. 6 illustrates exemplary operations according to one embodiment, other embodiments may add to and/or modify the operations shown in FIG. 6. The operations shown in FIG. 6 may be performed by system 100, any components included therein, and/or any implementation thereof.

At operation 602, a system (e.g., virtual avatar processing system 100) may process a plurality of video conference recordings generated by a video conference platform to select user image information associated with a plurality of users that participated in video conference sessions represented in the plurality of video conference recordings. Operation 602 may be performed in any of the ways described herein.

At operation 604, the system may generate, based on the user image information, a template model that is generic to the plurality of users. Operation 604 may be performed in any of the ways described herein.

At operation 606, the system may select, from the user image information and based on predefined selection criteria, video frames that depict a user included in the plurality of users. Operation 606 may be performed in any of the ways described herein.

At operation 608, the system may generate, based on the user image information, a virtual avatar of the user. The virtual avatar may be configured to be used in future video conference sessions in place of a live video image of the user. Operation 608 may be performed in any of the ways described herein.

Figure 7:
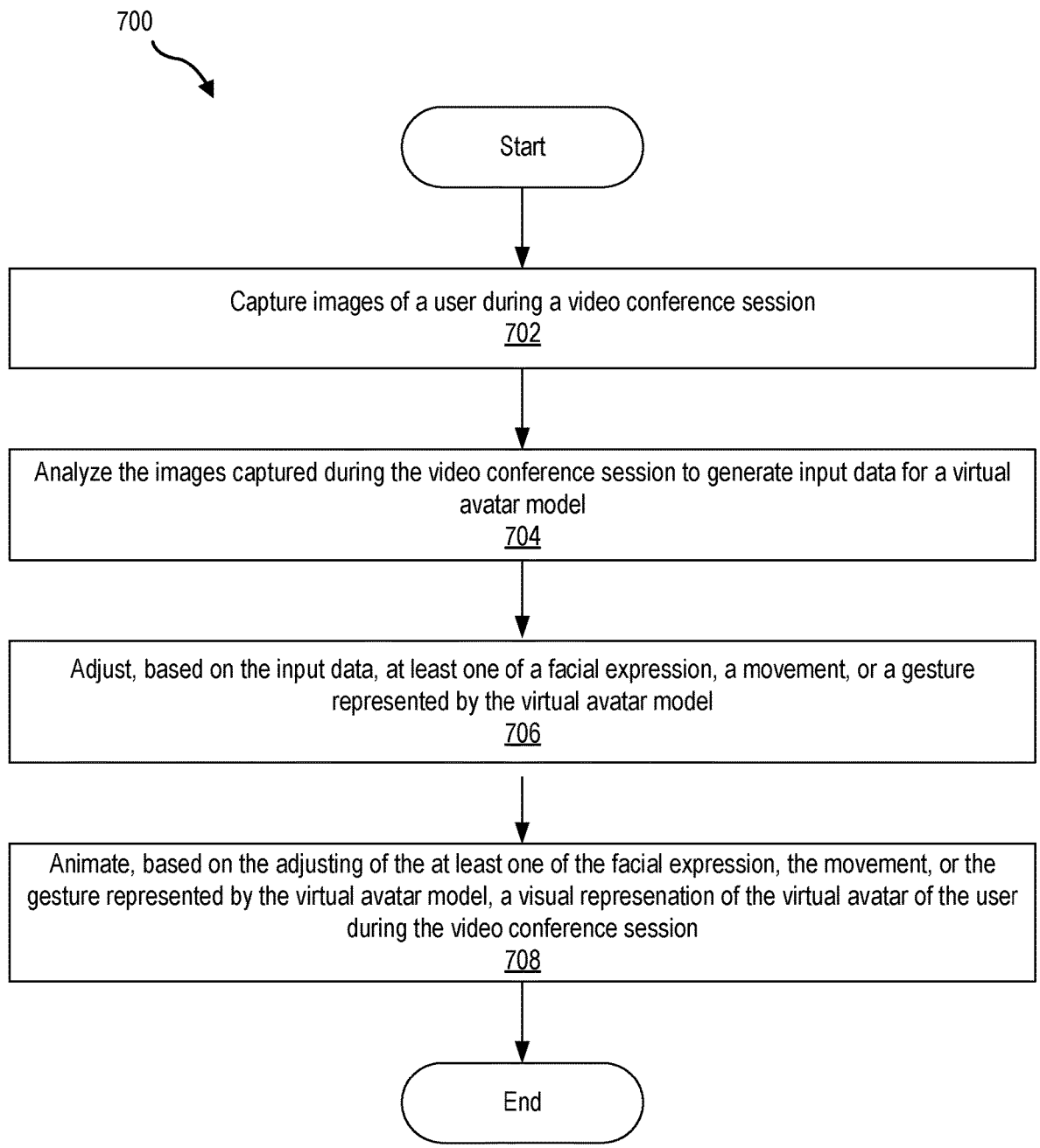

FIG. 7 illustrates an additional exemplary method 700 for implementing a virtual avatar model for a video conference session. While FIG. 7 illustrates exemplary operations according to one embodiment, other embodiments may add to and/or modify the operations shown in FIG. 7. The operations shown in FIG. 7 may be performed by system 100, any components included therein, and/or any implementation thereof.

At operation 702, a system (e.g., virtual avatar processing system 100) may capture images of a user during a video conference session. Operation 702 may be performed in any of the ways described herein.

At operation 704, the system may analyze the images captured during the video conference session to generate input data for the virtual avatar model. Operation 704 may be performed in any of the ways described herein.

At operation 706, the system may adjust, based on the input data, at least one of a facial expression, a movement, or a gesture represented by the virtual avatar model. Operation 706 may be performed in any of the ways described herein.

At operation 708, the system may animate, based on the adjusting of the at least one of the facial expression, the movement, or the gesture represented by the virtual avatar model, a visual representation of the virtual avatar model of the user during the video conference session. Operation 708 may be performed in any of the ways described herein.

Although the preceding disclosure describes virtual avatars models configured to be used during video conference sessions, it is understood that such virtual avatars may be implemented in any other suitable context where it may be desirable to present a visual representation of a virtual avatar model for display in lieu of a live video image of a user. For example, a visual representation of a virtual avatar model may be used during a video phone call between two or more participants, during a live stream on a video streaming platform, and/or in any other suitable context. In addition, virtual avatar models such as those described herein may be additionally or alternatively generated based on recordings other than video conference recordings. For example, system 100 may leverage social media posts, video streaming platform recordings, etc. to facilitate generating virtual avatar models in certain implementations.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory (RAM), and an optical disc (e.g., a compact disc, a digital video disc, a Blu-ray disc, etc.). Exemplary volatile storage media include, but are not limited to, RAM (e.g., dynamic RAM).

Figure 8:
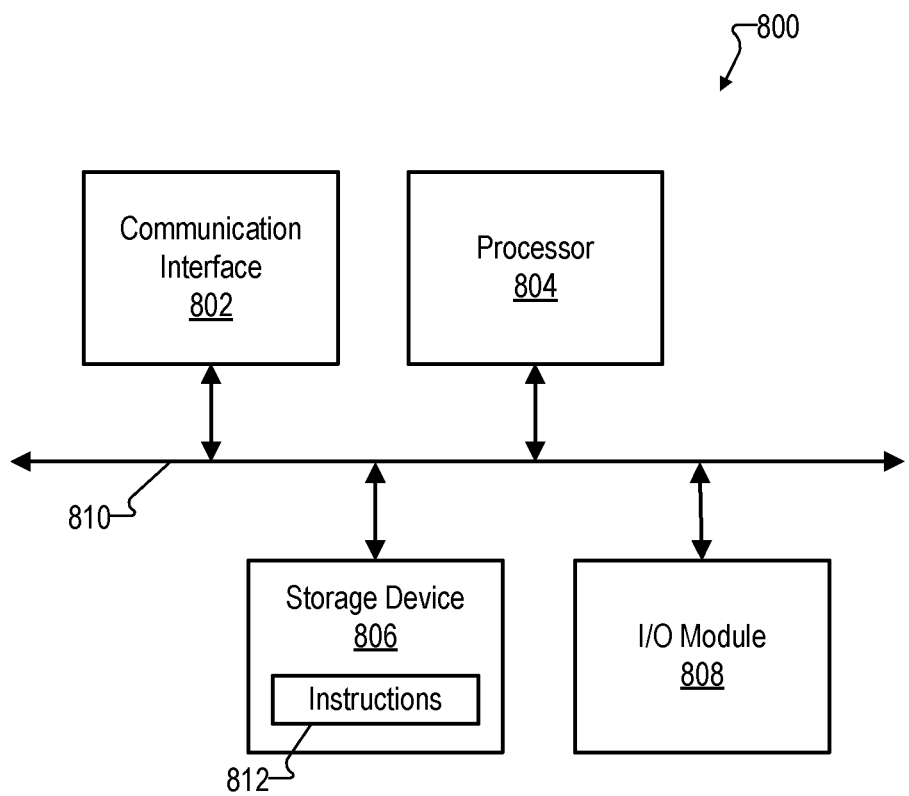
FIG. 8 illustrates an exemplary computing device according to principles described herein.

FIG. 8 illustrates an exemplary computing device 800 that may be specifically configured to perform one or more of the processes described herein. As shown in FIG. 8, computing device 800 may include a communication interface 802, a processor 804, a storage device 806, and an input/output (I/O) module 808 communicatively connected one to another via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data and/or interpreting, executing, and/or directing execution of one or more of the instructions, processes, and/or operations described herein. Processor 804 may perform operations by executing computer-executable instructions 812 (e.g., an application, software, code, and/or other executable data instance) stored in storage device 806.

Storage device 806 may include one or more data storage media, devices, or configurations and may employ any type, form, and combination of data storage media and/or device.

For example, storage device 806 may include, but is not limited to, any combination of the non-volatile media and/or volatile media described herein. Electronic data, including data described herein, may be temporarily and/or permanently stored in storage device 806. For example, data representative of computer-executable instructions 812 configured to direct processor 804 to perform any of the operations described herein may be stored within storage device 806. In some examples, data may be arranged in one or more location databases residing within storage device 806.

I/O module 808 may include one or more I/O modules configured to receive user input and provide user output. One or more I/O modules may be used to receive input for a virtual experience. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 800. For example, memory 102 may be implemented by storage device 806, and processor 104 may be implemented by processor 804.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
   a memory that stores instructions; and
   a processor communicatively coupled to the memory and configured to execute the instructions to:
   process a plurality of video conference recordings generated by a video conference platform to select user image information associated with a plurality of users that participated in video conference sessions represented in the plurality of video conference recordings;
   generate, based on the user image information, a template model that represents human physiology and that is generic to the plurality of users;
   select, from the user image information and based on predefined selection criteria, video frames that depict a user included in the plurality of users; and
   generate a virtual avatar model of the user by applying the selected video frames to the template model, a visual representation of the virtual avatar model configured to be used in future video conference sessions in place of a live video image of the user.

2. The system of claim 1, wherein the processing of the plurality of video conference recordings includes filtering the plurality of video conference recordings based on conference metadata.

3. The system of claim 1, wherein the template model corresponds to a three-dimensional (3D) template model.

4. The system of claim 1, wherein the video frames include a plurality of views of a head of the user captured at different image capture angles.

5. The system of claim 1, wherein the predefined selection criteria include a plurality of metrics to assess whether the video frames are suitable for application to the template model, the plurality of metrics including at least one of a presence factor, a scale factor, a pixel factor, or an occlusion factor.

6. The system of claim 1, wherein the visual representation of the virtual avatar model is a photorealistic representation of the user.

7. The system of claim 1, wherein the processor is further configured to execute the instructions to:
   detect a user input selecting an option to use the virtual avatar model of the user during a video conference session; and
   provide the visual representation of the virtual avatar model for display to other participants during the video conference session in place of the live video image of the user.

8. The system of claim 7, wherein the processor is further configured to execute the instructions to:
   capture images of the user during the video conference session;
   analyze the images captured during the video conference session to generate input data for the virtual avatar model;
   adjust, based on the input data, at least one of a facial expression, a movement, or a gesture represented by the virtual avatar model; and
   animate, based on the adjusting of the at least one of the facial expression, the movement, or the gesture represented by virtual avatar model, the visual representation of the virtual avatar model during the video conference session.

9. The system of claim 8, wherein the animating of the visual representation of the virtual avatar model includes limiting the animating to only represent facial expressions of the user during the video conference session.

10. The system of claim 7, wherein the processor is further configured to execute the instructions to animate the visual representation of the virtual avatar model during the video conference session based on at least one of predefined expressions or predefined gestures selected by the user during the video conference session.

11. A non-transitory computer-readable medium storing instructions that, when executed, direct at least one processor of a computing device to:
process a plurality of video conference recordings generated by a video conference platform to select user image information associated with a plurality of users that participated in video conference sessions represented in the plurality of video conference recordings;
generate, based on the user image information, a template model that represents human physiology and that is generic to the plurality of users;
select, from the user image information and based on predefined selection criteria, video frames that depict a user included in the plurality of users; and
generate a virtual avatar model of the user by applying the selected video frames to the template model, a visual representation of the virtual avatar model configured to be used in future video conference sessions in place of a live video image of the user.

12. The non-transitory computer-readable medium of claim 11, wherein the processing of the plurality of video conference recordings includes filtering the plurality of video conference recordings based on conference metadata.

13. The non-transitory computer-readable medium of claim 11, wherein the template model corresponds to a three-dimensional (3D) template model.

14. The non-transitory computer-readable medium of claim 13, wherein the instructions are further configured to direct the at least one processor of the computing device to:
detect a user input selecting an option to use the virtual avatar model of the user during a video conference session; and
provide the visual representation of the virtual avatar model for display to other participants during the video conference session in place of the live video image of the user.

15. The non-transitory computer-readable medium of claim 11, wherein the video frames include a plurality of views of a head of the user captured at different image capture angles.

16. The non-transitory computer-readable medium of claim 11, wherein the predefined selection criteria include a plurality of metrics to assess whether the video frames are suitable for application to the template model, the plurality of metrics including at least one of a presence factor, a scale factor, pixel factor, or an occlusion factor.

17. A method comprising:
processing, by a virtual avatar processing system, a plurality of video conference recordings generated by a video conference platform to curate user image information associated with a plurality of users that participated in video conference sessions represented in the plurality of video conference recordings;
generating, by the virtual avatar processing system and based on the user image information, a template model that represents human physiology and that is generic to the plurality of users;
selecting, by the virtual avatar processing system from the user image information and based on predefined selection criteria, video frames that depict a user included in the plurality of users; and
generating, by the virtual avatar processing system, a virtual avatar model of the user by applying the selected video frames to the template model, a visual representation the virtual avatar model configured to be used in future video conference sessions in place of a live video image of the user.

18. The method of claim 17, further comprising:
detecting, by the virtual avatar processing system, a user input selecting an option to use the virtual avatar model of the user during a video conference session; and
providing, by the virtual avatar processing system and based on the user input, a visual representation of the virtual avatar model for display to other participants during the video conference session in place of a live video image of the user.

19. The method of claim 18, further comprising:
capturing, by the virtual avatar processing system, images of the user during the video conference session;
analyzing, by the virtual avatar processing system, the images captured during the video conference session to generate input data for the virtual avatar model;
adjusting, by the virtual avatar processing system and based on the input data, at least one of a facial expression, a movement, or a gesture represented by the virtual avatar model; and
animating, by the virtual avatar processing system and based on the adjusting of the at least one of the facial expression, the movement, or the gesture represented by virtual avatar model, the visual representation of the virtual avatar model during the video conference session.

20. The method of claim 18, further comprising animating the visual representation of the virtual avatar model during the video conference session based on at least one of predefined expressions or predefined gestures selected by the user during the video conference session.

* * * * *